(12) United States Patent
Baarman et al.

(10) Patent No.: US 10,170,935 B2
(45) Date of Patent: *Jan. 1, 2019

(54) INDUCTIVE POWER SUPPLY WITH DUTY CYCLE CONTROL

(71) Applicant: Philips IP Ventures B.V., Eindhoven (NL)

(72) Inventors: David W. Baarman, Fennville, MI (US); Scott A. Mollema, Rockford, MI (US); Joshua K. Schwannecke, Grand Rapids, MI (US); Thomas Jay Leppien, Grand Haven, MI (US); Kenneth Michael Burns, North Canton, OH (US)

(73) Assignee: PHILIPS IP VENTURES B.V., Eindhoven (NL)

(*) Notice: Subject to any disclaimer, the term of this patent is extended or adjusted under 35 U.S.C. 154(b) by 409 days.

This patent is subject to a terminal disclaimer.

(21) Appl. No.: 15/002,048

(22) Filed: Jan. 20, 2016

(65) Prior Publication Data

US 2016/0134134 A1 May 12, 2016

Related U.S. Application Data

(63) Continuation of application No. 13/355,757, filed on Jan. 23, 2012, now Pat. No. 9,257,851, which is a (Continued)

(51) Int. Cl.
*H02J 50/12* (2016.01)
*H02J 50/90* (2016.01)
(Continued)

(52) U.S. Cl.
CPC .............. *H02J 50/12* (2016.02); *H02J 5/005* (2013.01); *H02J 7/025* (2013.01); *H02J 17/00* (2013.01);
(Continued)

(58) Field of Classification Search
CPC ................................. H02J 50/10; H02J 50/12
See application file for complete search history.

(56) References Cited

U.S. PATENT DOCUMENTS 4,076,996 A    2/1978  Maehara et al.
4,639,714 A    1/1987  Crowe
(Continued)

FOREIGN PATENT DOCUMENTS

EP    0 178 852    4/1986
EP    0 267 009    5/1988
(Continued)

OTHER PUBLICATIONS

US 4,658,187, 04/1987, Grubbs (withdrawn)
(Continued)

*Primary Examiner* — Fritz M Fleming
(74) *Attorney, Agent, or Firm* — Larry Liberchuk (57) ABSTRACT

An inductive power supply that maintains resonance and adjusts duty cycle based on feedback from a secondary circuit. A controller, driver circuit and switching circuit cooperate to generate an AC signal at a selected operating frequency and duty cycle. The AC signal is applied to the tank circuit to create an inductive field for powering the secondary. The secondary communicates feedback about the received power back to the primary controller. The power transfer efficiency may be optimized by maintaining the operating frequency substantially at resonance, and the amount of power transferred may be controlled by adjusting the duty cycle.

20 Claims, 10 Drawing Sheets

Related U.S. Application Data continuation of application No. 12/349,840, filed on Jan. 7, 2009, now Pat. No. 8,129,864.

(60) Provisional application No. 61/019,411, filed on Jan. 7, 2008.

(51) Int. Cl.

| | | |
|---|---|---|
| *H02J 50/80* | (2016.01) | |
| *H02J 50/40* | (2016.01) | |
| *H02J 5/00* | (2016.01) | |
| *H02J 7/02* | (2016.01) | |
| *H02M 3/335* | (2006.01) | |
| *H02J 17/00* | (2006.01) | |

(52) U.S. Cl.
CPC .............. *H02J 50/40* (2016.02); *H02J 50/80* (2016.02); *H02J 50/90* (2016.02); *H02M 3/33523* (2013.01); *Y02B 70/1433* (2013.01)

(56) References Cited

U.S. PATENT DOCUMENTS

| | | | |
|---|---|---|---|
| 5,122,729 A | 6/1992 | Itoga et al. | |
| 5,298,836 A | 3/1994 | Backmund et al. | |
| 5,319,174 A | 6/1994 | Omori et al. | |
| 5,325,046 A | 6/1994 | Young et al. | |
| 5,745,351 A | 4/1998 | Taurand | |
| 5,905,372 A | 5/1999 | Kuffner et al. | |
| 5,925,278 A | 7/1999 | Hirst | |
| 5,963,012 A | 10/1999 | Garcia et al. | |
| 5,999,433 A | 12/1999 | Hua et al. | |
| 6,072,362 A | 6/2000 | Lincoln | |
| 6,141,227 A | 10/2000 | Sheikh et al. | |
| 6,157,258 A | 12/2000 | Adishian et al. | |
| 6,255,635 B1 | 7/2001 | Thompson et al. | |
| 6,271,508 B1 | 8/2001 | Thompson et al. | |
| 6,316,756 B1 | 11/2001 | Thompson et al. | |
| 6,348,679 B1 | 2/2002 | Ryan et al. | |
| 6,359,267 B1 | 3/2002 | Wilcox et al. | |
| 6,515,878 B1 | 2/2003 | Meins et al. | |
| 6,521,874 B2 | 2/2003 | Thompson et al. | |
| 6,529,127 B2 | 3/2003 | Townsend et al. | |
| 6,600,142 B2 | 7/2003 | Ryan et al. | |
| 6,617,557 B1 | 9/2003 | Ryan et al. | |
| 6,649,888 B2 | 11/2003 | Ryan et al. | |
| 6,664,881 B1 | 12/2003 | Thompson et al. | |
| 6,727,482 B2 | 4/2004 | Bassill et al. | |
| 6,730,894 B2 | 5/2004 | Thompson et al. | |
| 6,812,445 B2 | 11/2004 | Gorbold | |
| 6,825,620 B2 | 11/2004 | Kuennen et al. | |
| 6,861,629 B2 | 3/2005 | Dahake et al. | |
| 6,912,137 B2 | 6/2005 | Berghegger | |
| 6,934,167 B2 | 8/2005 | Jang et al. | |
| 6,995,345 B2 | 2/2006 | Gorbold | |
| 7,180,248 B2 | 2/2007 | Kuennen et al. | |
| 7,208,912 B2 | 4/2007 | Ghabra et al. | |
| 7,212,414 B2 | 5/2007 | Baarman | |
| 7,279,665 B2 | 10/2007 | Kagan | |
| 7,385,357 B2 | 6/2008 | Kuennen et al. | |
| 7,489,530 B2 | 2/2009 | Paull | |
| 7,551,011 B2 | 6/2009 | Paull | |
| 7,579,715 B2 | 8/2009 | Seelig et al. | |
| 7,602,142 B2 | 10/2009 | Weber et al. | |
| 7,626,463 B2 | 12/2009 | Paull | |
| 7,804,045 B2 | 9/2010 | Rosenbloom et al. | |
| 8,129,864 B2 | 3/2012 | Baarman et al. | |
| 9,257,851 B2 * | 2/2016 | Baarman ................. | H02J 50/12 |
| 2003/0210106 A1 | 11/2003 | Cheng et al. | |
| 2003/0214821 A1 | 11/2003 | Giannopoulos et al. | |
| 2004/0130915 A1 | 7/2004 | Baarman | |
| 2004/0130916 A1 | 7/2004 | Baarman | |
| 2004/0145342 A1 | 7/2004 | Lyon | |
| 2007/0171681 A1 | 7/2007 | Baarman | |
| 2007/0182367 A1 | 8/2007 | Partovi | |
| 2010/0123451 A1 | 5/2010 | Freer | |
| 2010/0171367 A1 | 7/2010 | Kitamura et al. | |

FOREIGN PATENT DOCUMENTS

| | | |
|---|---|---|
| EP | 1 209 791 | 11/2001 |
| JP | H08-340285 | 12/1996 |
| JP | H08-340650 | 12/1996 |
| JP | H09-103037 | 4/1997 |
| JP | H09-149565 | 6/1997 |
| JP | H10-014139 | 1/1998 |
| JP | H10-108391 | 4/1998 |
| JP | H10-174206 | 6/1998 |
| JP | H11-188113 | 7/1999 |
| JP | 2000-270501 | 9/2000 |
| JP | 2001-238372 | 8/2001 |
| JP | 2001-238373 | 8/2001 |
| JP | 2006-517778 | 7/2006 |
| JP | 2007336788 A | 12/2007 |
| WO | 94/28560 | 12/1994 |
| WO | 96/05648 | 2/1996 |
| WO | 96/17499 | 6/1996 |
| WO | 00/54387 | 9/2000 |
| WO | 2004/018037 | 3/2004 |
| WO | 2004/073150 | 8/2004 |
| WO | 2004/073166 | 8/2004 |
| WO | 2005/122686 | 12/2005 |
| WO | 2006/031133 | 3/2006 |
| WO | 2008/137996 | 9/2011 |

OTHER PUBLICATIONS

International Search Report and Written Opinion of the International Searching Authority for International Application No. PCT/2009/030280 dated May 4, 2009.

\* cited by examiner

INDUCTIVE POWER SUPPLY WITH DUTY CYCLE CONTROL

The present invention relates to inductive power and more particularly to a system and method for wirelessly supplying power.

BACKGROUND OF THE INVENTION

In recent years, wireless power supply systems have received increased attention because of some of their benefits over traditional wired power supply systems. Some more basic wireless power supply systems are specifically designed to charge a particular device, which can help minimize power transfer efficiency issues. Other wireless power supply systems attempt to account for misalignment, charge different remote devices and provide different amounts of power. In these systems, maintaining an acceptable power transfer efficiency can be difficult.

Some wireless power systems adjust the operating frequency of an AC signal across the tank circuit closer to or further from resonance to increase or decrease the amount of power delivered to the remote device. Other wireless power systems adjust the resonant frequency of the tank circuit closer to or further from the operating frequency. One issue with these systems is that the power transfer efficiency between the inductive power supply and the remote device is a function of how close the operating frequency is to resonance. So, while adjusting the operating frequency or resonant frequency can provide some control over the amount of power delivered to the remote device, it may come at the cost of decreased power transfer efficiency.

Other wireless power supplies use a fixed operating frequency and instead adjust the rail voltage, duty cycle, or phase of the AC signal across the tank circuit to increase or decrease the amount of power delivered to the remote device. One issue with this is that in order for the power transfer efficiency to be acceptable, the inductive power supply and remote device may need to be precisely aligned and specifically designed to work with each other.

SUMMARY OF THE INVENTION

The present invention provides an inductive power supply that maintains resonance and adjusts duty cycle based on feedback from a secondary circuit. In one embodiment, the inductive power supply includes a primary controller, a driver circuit, a switching circuit, and a tank circuit. The controller, driver circuit and switching circuit cooperate to generate an AC signal at a selected operating frequency and duty cycle. The AC signal is applied to the tank circuit to create an inductive field for powering the secondary. The secondary communicates feedback about the received power back to the primary controller. The power transfer efficiency may be optimized by maintaining the operating frequency substantially at resonance, and the amount of power transferred may be controlled by adjusting the duty cycle.

In one embodiment, the secondary circuit includes a secondary, a rectifier, a switch, a load, a sensor, a secondary controller, and a communication means. A voltage and/or current sensor detects characteristics about the power which are transmitted back to the primary controller using the communication means. Optionally, over-voltage and over-current protection may be provided. If a fault condition is detected the load is disconnected using the switch.

In one embodiment, a process for inductively powering a load by maintaining substantial resonance and adjusting duty cycle is provided. Initially an operating frequency and duty cycle are set to an acceptable value. The initial operating frequency is determined by sweeping a range of frequencies and selecting the operating frequency which provided the highest power transfer efficiency. The initial duty cycle is set to a relatively low value, such as 20%, to ensure that too much power is not delivered to the secondary. Once the initial values have been set, the inductive power supply enters a continuous process of adjusting the operating frequency to maintain substantial resonance and adjusting the duty cycle depending on whether the amount of power is too high or too low or temperature is too high.

The present invention provides a simple and effective system and method for providing a selected amount of wireless power while maintaining a high transfer efficiency. Adjustment of duty cycle provides another level of control of wireless power transfer, one which can be used to fine tune the amount of power provided to a secondary. Additionally, the ability to adjust the amount of power being transferred while maintaining substantial resonance results in fewer overall losses and easier fulfillment of specified power requirements.

These and other objects, advantages, and features of the invention will be readily understood and appreciated by reference to the detailed description of the current embodiment and the drawings.

DESCRIPTION OF THE CURRENT EMBODIMENT

I. Overview

Figure 1:
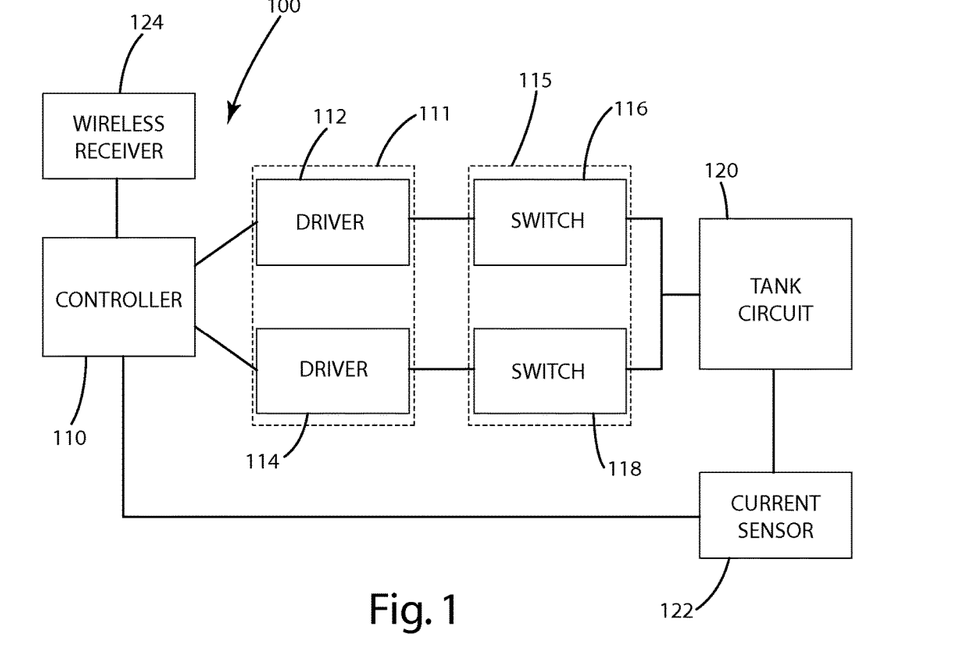
FIG. 1 is a block diagram of an inductive power supply.
Figure 2:
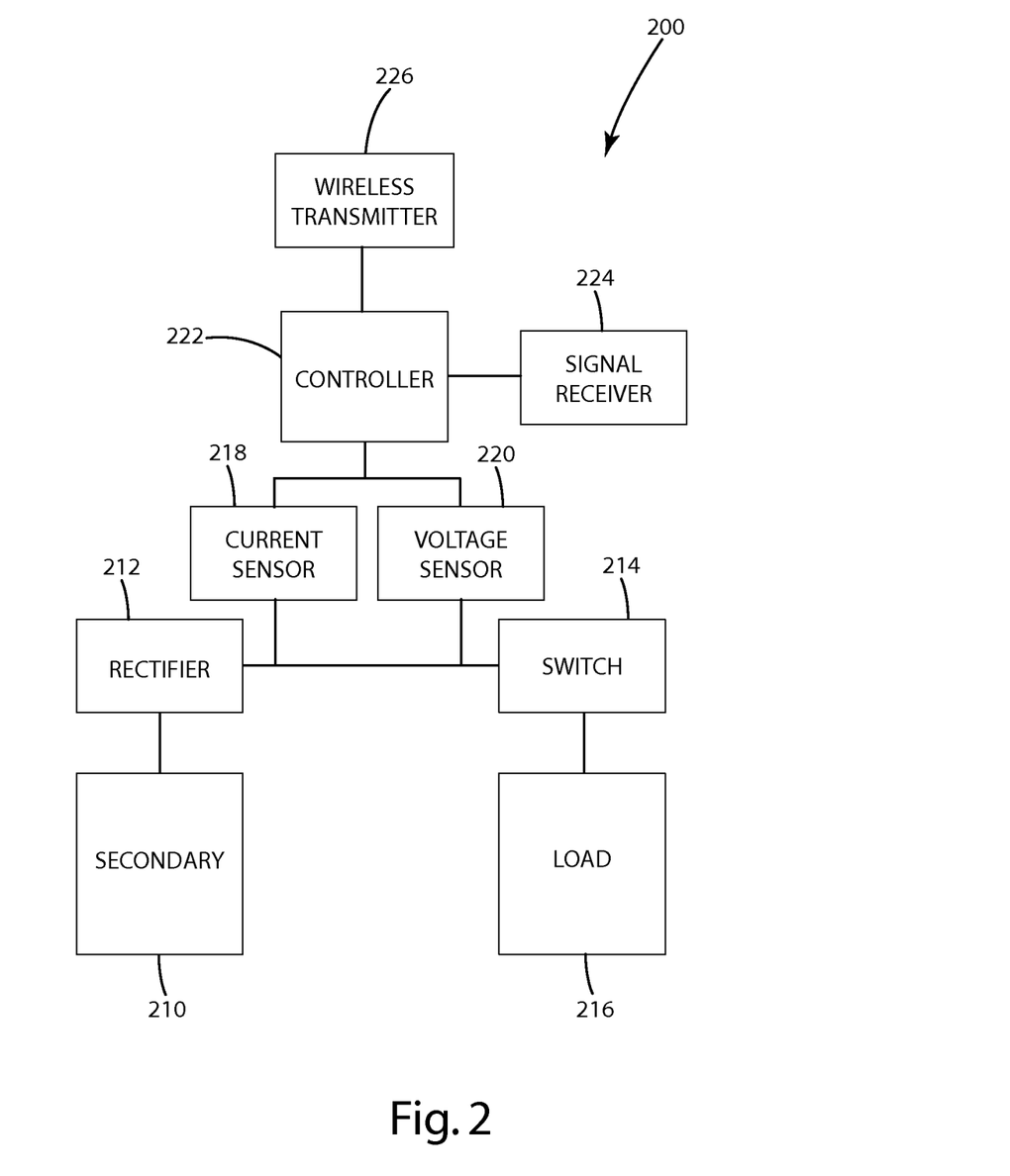
FIG. 2 is a block diagram of a secondary circuit.

An inductive power supply or primary circuit in accordance with an embodiment of the present invention is shown in FIG. 1, and generally designated 100. The primary circuit 100 includes a primary controller 110, a driver circuit 111 including a pair of drivers 112, 114, a switching circuit 115 including a pair of switches 116, 118, a tank circuit 120 a primary sensor 122 and an optional wireless receiver 124. The primary controller 110, driver circuit 111 and the switching circuit 115 together generate an AC signal at a selected frequency and selected duty cycle that is applied to the tank circuit 120 to create an inductive field for transferring power wirelessly to a secondary circuit. A secondary circuit in accordance with an embodiment of the present invention is shown in FIG. 2, and generally designated 200. The secondary circuit 200 may include a secondary 210, a rectifier 212, a switch 214, a load 216, a current sensor 218 or voltage sensor 220, a secondary controller 222, a signal resistor 224 for communicating using reflected impedance and an optional wireless transmitter 226.

Figure 5:
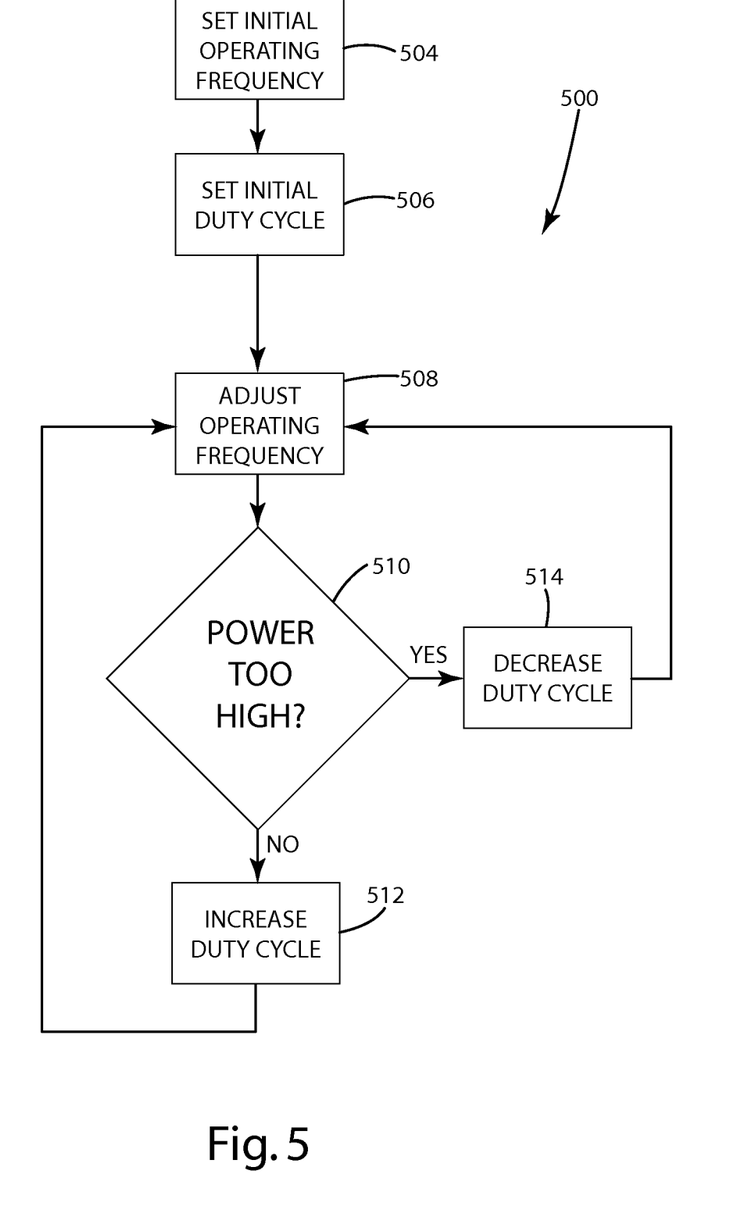
FIG. 5 is a flowchart of a process to maintain resonance and adjust duty cycle.

In operation, an embodiment of the process for adjusting the duty cycle is shown in FIG. 5, the initial operating frequency is set substantially at resonant frequency 504 and the initial duty cycle is set at a relatively low value 506. The primary controller continuously adjusts the operating frequency 508 to maintain substantially resonant frequency and continuously determines if the amount of power being transferred is too high 510. If too much power is being provided or temperatures are above a preset threshold then the duty cycle is decreased 514. If too little power is being provided then the duty cycle is increased 512. Various conditions may temporarily or permanently reduce or halt the power transfer.

II. Inductive Power Supply

The present invention is suitable for use with a wide variety of inductive power supplies. As used herein, the term "inductive power supply" is intended to broadly include any inductive power supply capable of providing power wirelessly. The present invention is also suitable for use with "adaptive inductive power supplies." As used herein, the term "adaptive inductive power supply" is intended to broadly include any inductive power supply capable of providing power wirelessly at a plurality of different frequencies. For purposes of disclosure, the present invention is described in connection with a particular adaptive inductive power supply, shown in FIGS. 3A-3D and generally designated 300. The illustrated adaptive inductive power supply 300 is merely exemplary, however, and the present invention may be implemented with essentially any inductive power supply that can be modified to provide inductive power at varying duty cycles.

In the illustrated embodiment, the adaptive inductive power supply 300 generally includes a primary controller 310, a low voltage power supply 312, memory 314, a driver circuit 316, a switching circuit 318 a tank circuit 320, a current sensor 322, a filter 324 and optionally a wireless receiver 326. In operation, the primary controller 310, driver circuit 316 and switching circuit 318 apply power to the tank circuit 320 to generate a source of electromagnetic inductive power at a selected frequency and a selected duty cycle.

Figure 3A:
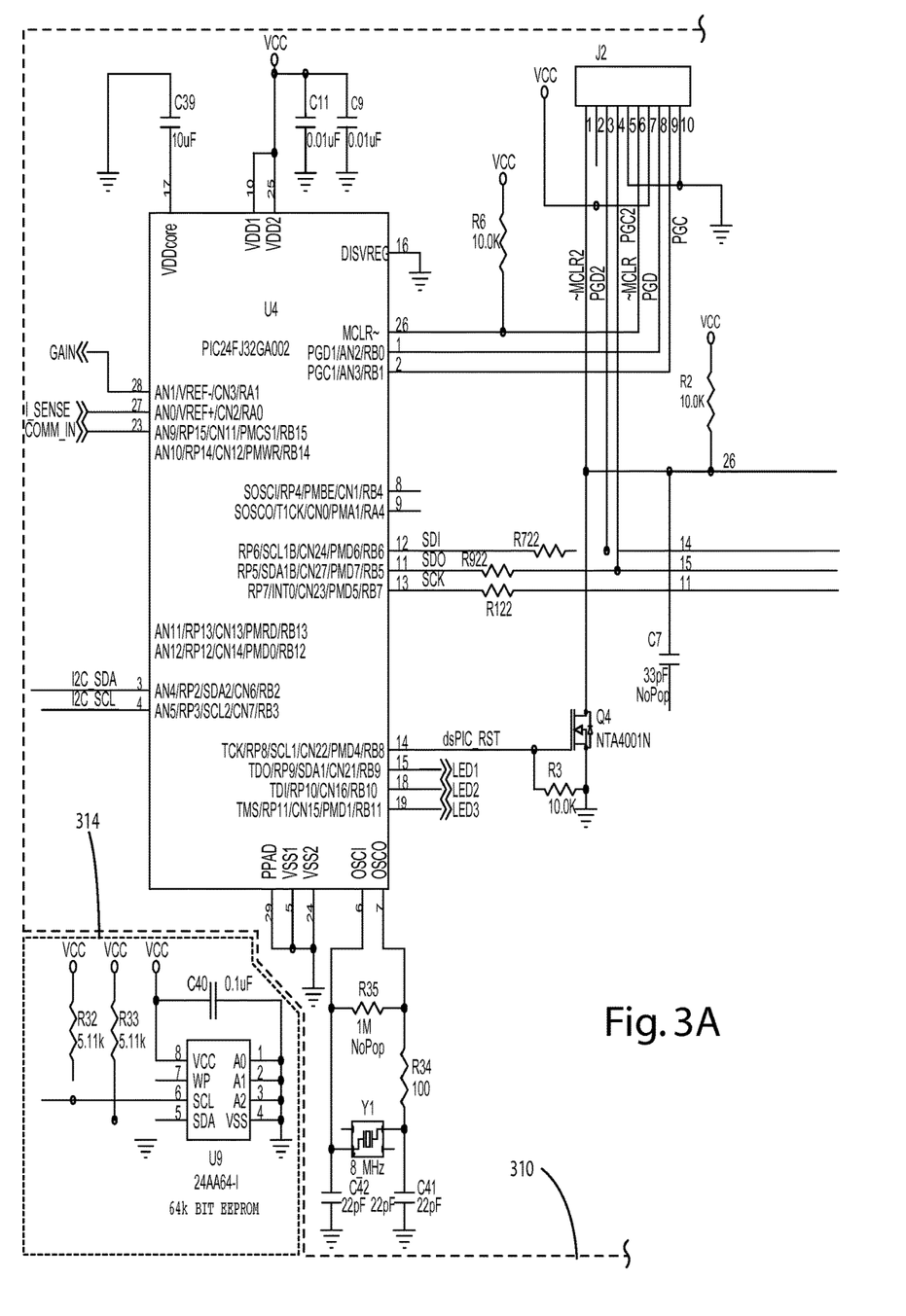
FIGS. 3A-3D together are a circuit diagram of an inductive power supply.
Figure 3B:
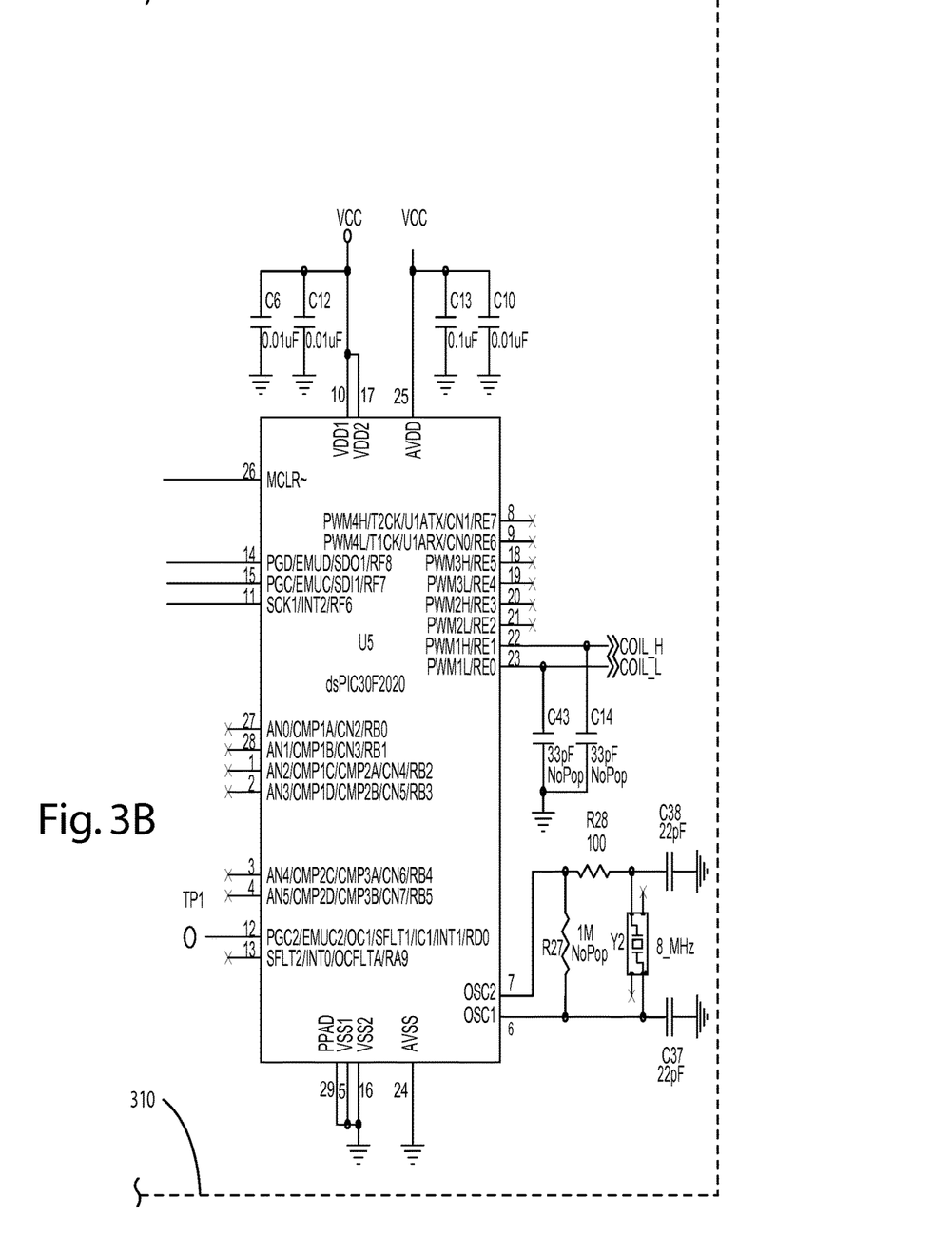
Figure 3C:
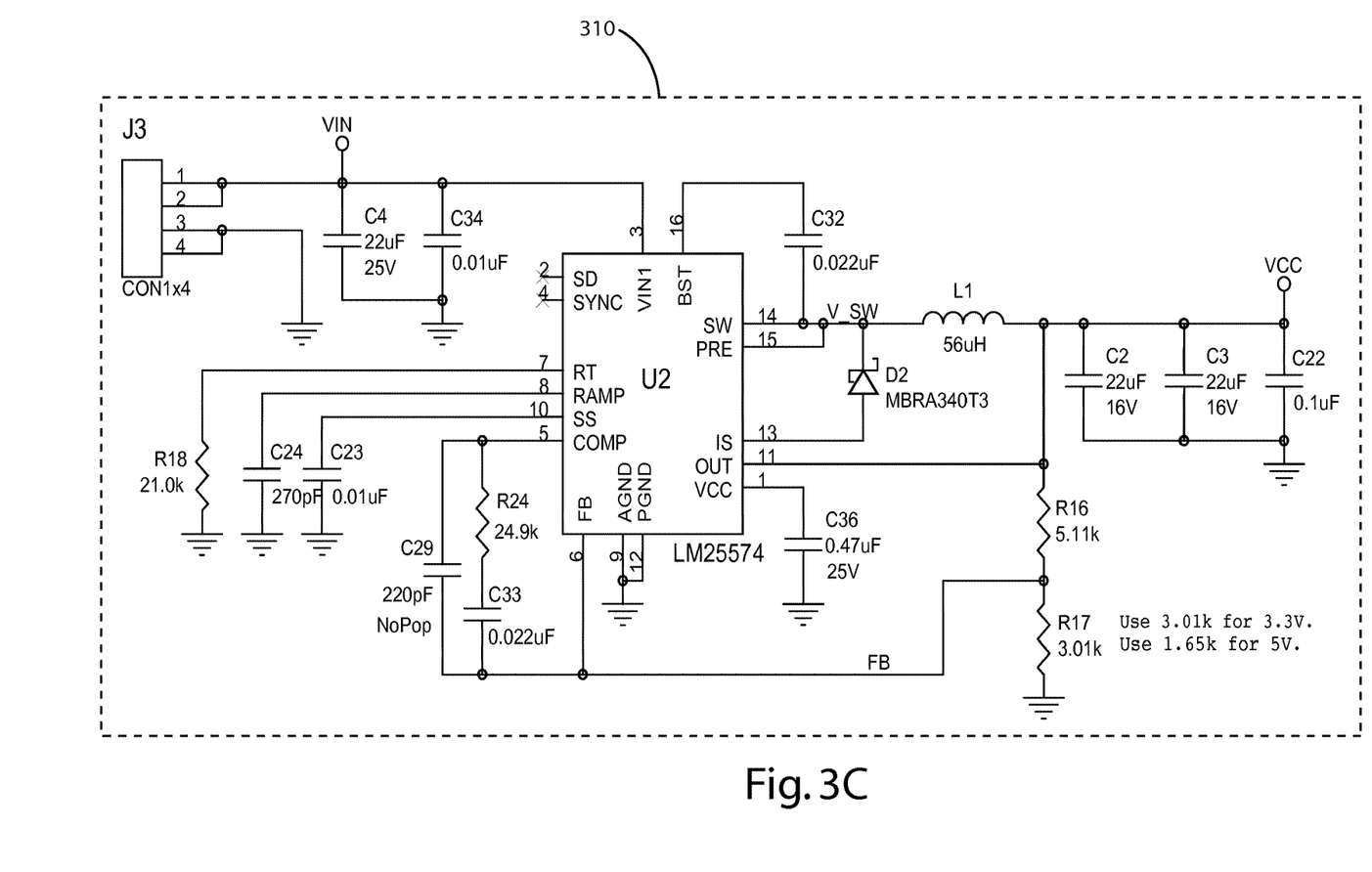
Figure 3D:
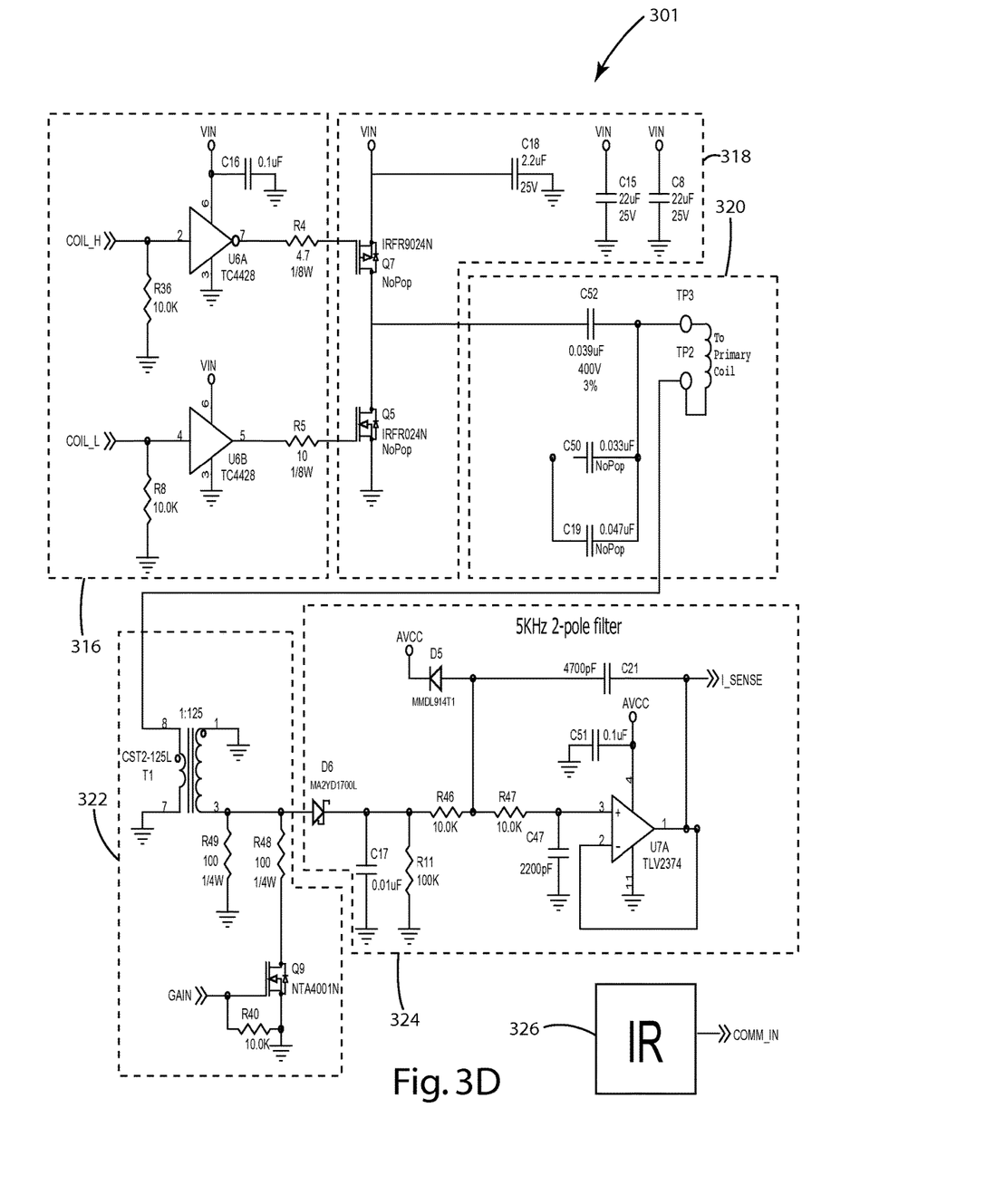

The primary controller 310 of the illustrated embodiment includes two microcontrollers, one to control the frequency and one to control the duty cycle. The frequency microcontroller may be a microcontroller, such as a PIC24FJ32GA002, or a more general purpose microprocessor. The duty cycle microcontroller may be a microcontroller, such as a dsPIC30F2020, or a more general purpose microprocessor. In alternative embodiments, the primary controller 310 may be implemented using a single microcomputer, FPGA, analog or digital circuit. The driver circuit 316 may be discrete components, as shown in FIG. 3D, or they may be incorporated into the primary controller 310. An oscillator (not shown) may be included within the primary controller 310.

The primary circuit 300 may also include a low voltage power supply 312 for supplying low voltage power to the primary controller 310, the driver circuit as well as any other components requiring low voltage power for operation. In the illustrated embodiment the low voltage power supply 312 provides scales the input voltage to 3.3 volts. In alternative embodiments, a different voltage may be provided.

Figure 8:
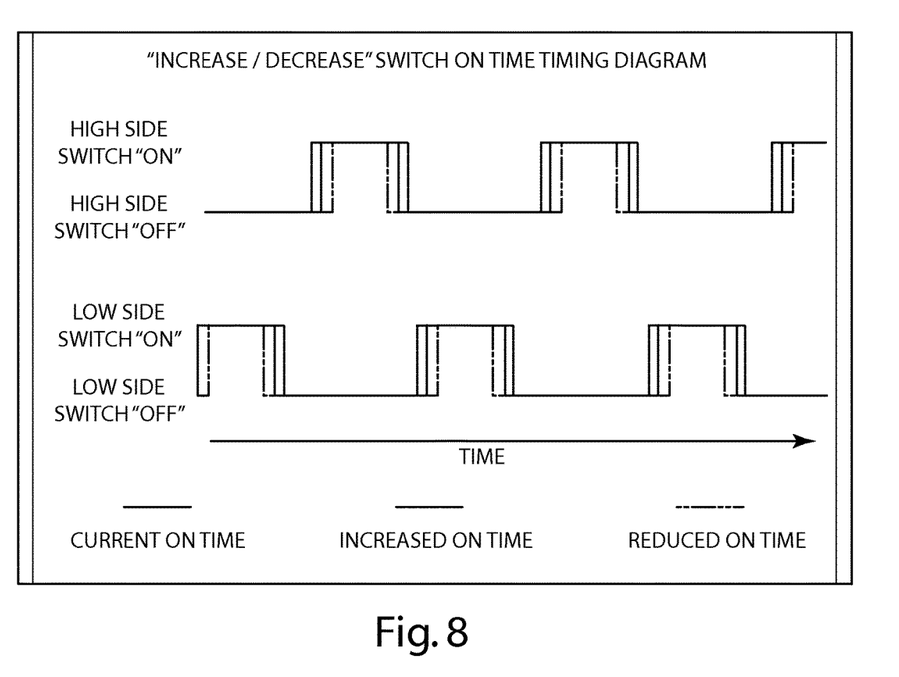
FIG. 8 is a timing diagram showing a varying duty cycle.

In the current embodiment, the various components of the primary circuit 310 collectively drive the tank circuit 320 at a frequency and duty cycle dictated by the primary controller 310. More specifically, the primary controller 310 controls the timing of the driver circuit 316 and switching circuit 318. The timing refers to both the frequency and duty cycle of the signal being generated. Frequency as it is being used here refers to the number of repetitions per unit time of a complete waveform. Duty cycle refers to the proportion of time during which the waveform is high compared to the total amount of time for a complete waveform. Thus, a square wave as shown in FIG. 8, may be described by its frequency and its duty cycle. Further, the duty cycle may be adjusted while maintaining the same frequency and the frequency may be adjusted while maintaining the same duty cycle. The driver circuit 316 of the illustrated embodiment includes two separate drivers and may include additional circuit components to boost and filter the signal. For example, in the current embodiment, the signal is boosted to 20 volts, without effecting the timing of the signal.

The switching circuit 318 includes two switches. In the current embodiment, the switches are implemented as MOS field effect transistors. In alternative embodiments, other circuit components may be used to implement the switching circuit. Additionally, depending on power requirements MOSFETs with different characteristics may be implemented during manufacture. In some embodiments, multiple sets of switches may be provided on the circuit board, allowing one set of switches to be soldered at the time of manufacture based on the particular power requirements of that application.

In one embodiment, the switching circuit 115 includes two separate switches 116, 118 that are switched on at the same frequency, but out of phase with each other. FIG. 8 illustrates the timing for one embodiment of such a switching circuit. In FIG. 8, both switches have the same duty cycle, but are shifted in time from each other by half of the period of the switching waveform. In alternative embodiments, each switch may have a different duty cycle and they the switches may be shifted in time a different amount from each other. That is, half period separation and similar duty cycle are desirable, but unnecessary, for the switches because it may result in increased power transfer efficiency from the inductive power supply to the remote device.

The tank circuit 320 generally includes the primary and a capacitor. The primary of the current embodiment is an air-core coil inductor. A cored inductor can also be used if the proper considerations are made for spatial freedom, monitoring overall power, and feedback. The capacitance of the capacitor may be selected to balance the impedance of the primary coil at anticipated operating parameters. In the current embodiment, although three tank capacitors are shown, all three capacitors need not necessarily be soldered into the circuit at the time of manufacture. An inductive power supply may be fabricated which at the time of soldering can have an appropriate capacitance value selected by soldering or switching different capacitors into the circuit. The tank circuit 320 may be either a series resonant tank circuit (as shown in FIG. 3D) or a parallel resonant tank circuit (not shown). The present invention may be incorporated into the adaptive inductive power supply shown in U.S. Pat. No. 6,825,620, which is incorporated herein by reference. As another example, the present invention may be incorporated into the adaptive inductive power supply shown in U.S. Patent Application Publication US2004/130916A1 to Baarman, which is entitled "Adapted Inductive Power Supply" and was published on Jul. 8, 2004 (U.S. Ser. No. 10/689,499, filed on Oct. 20, 2003), which is also incorporated herein by reference. Further, it may be desirable to use the present invention in connection with an adaptive inductive power supply capable of establishing wireless communications with the remote device, such as the adaptive inductive power supply shown in U.S. Patent Application Publication US 2004/130915A1 to Baarman, which is entitled "Adapted Inductive Power Supply with Communication" and was published on Jul. 8, 2004 (U.S. Ser. No. 10/689,148, filed on Oct. 20, 2003), which is incorporated herein by reference. Further yet, it may be desirable to use the present invention with a printed circuit board coil, such as a printed circuit board coil incorporating the invention principles of U.S. Serial No. 60/975,953, which is entitled "Printed Circuit Board Coil" and filed on Sep. 28, 2007 by Baarman et al, and which is incorporated herein by reference in its entirety. In other alternative embodiments, the inductor may be implemented as a multi-tap inductor and/or the capacitors may be implemented as a switched capacitor bank that may be used to dynamically, before or during use, alter the resonance of the primary circuit, for example, as described in U.S. Pat. No. 7,212,414, which is entitled "Adaptive Inductive Power Supply" and issued May 1, 2007, to Baarman, which is herein incorporated by reference.

In certain modes of operation, the primary controller 310 may establish the operating frequency as a function of input from the current sensor 322. The controller 310, in turn, operates the driver circuit 318 at the frequency established by the primary controller 310. The driver circuit 316 provides the signals necessary to operate the switching circuit 318. As a result, the switching circuit 318 provides AC (alternating current) power to the tank circuit 320 from a source of DC (direct current) power. In an alternative embodiment, the operating frequency is established from a separate communication link, such as the wireless receiver 326, implemented in the current embodiment as an IR receiver.

The primary controller 310 may also establish the duty cycle as a function of input from the current sensor 322. Planned shunting of the signal resistor on the secondary, which will be described in more detail below, may be used to provide information to the primary using reflected impedance detected with the current sensor 322. Alternatively, the duty cycle may be established using a separate communication link, such as the wireless receiver 326, implemented in the current embodiment as an IR receiver. This could also be near field or other RF communication channels.

In the illustrated embodiment, the current sensor 322 is a current transformer having a primary coil connected to the tank circuit and a secondary coil connected to the primary controller 310. In the current embodiment, the current sensor 322 includes circuitry to adjust the gain of the output of the current sensor to accommodate the ranges accepted by the primary controller 310. Further, the amount of gain may be adjusted by the primary controller 310 by applying a signal to the switch. The inductive power supply 300 may include conditioning circuitry 324 for conditioning the current transformer output before it is supplied to the primary controller 310. In the current embodiment, the conditioning circuitry 324 is a 5 K Hz 2-pole filter. Although the illustrated embodiment includes a current transformer for sensing the reflected impedance of the secondary or remote device, the inductive power supply 300 may include essentially any alternative type of sensor capable of providing information regarding reflected impedance from the secondary 400. Further, although the current sensor 322 of the illustrated embodiment is connected directly to the tank circuit, the current sensor (or other reflected impedance sensor) can be located in essentially any location where it is capable of providing readings indicative of the reflected impedance.

In the illustrated embodiment, the inductive power supply 300 further includes a memory 314 capable of storing information relating to the operating parameters of a plurality of secondaries 400. The stored information may be used to permit the inductive power supply 300 to more efficiently power the secondary 400 and more readily recognize fault conditions. In some applications, the inductive power supply 300 may be intended for use with a specific set of secondaries 400. In these applications, the memory 314 includes the unique resonant frequency (or pattern of frequencies) for each secondary 400, along with the desired collection of associated information, such as maximum and minimum operating frequencies, current usage and minimum and maximum duty cycle. The memory 314 may, however, include essentially any information that may be useful to the inductive power supply 300 in operating the secondary 400. For example, in applications where it is desirable to establish wireless communications with the secondary 400, the memory 314 may include information regarding the wireless communication protocol of the remote device 400.

III. Secondary Circuit

The present invention is intended for use with a wide variety of remote devices or secondaries of varying designs and constructions. It is anticipated that these various remote devices will require power at varying frequency and will have different power requirements.

Figure 4:
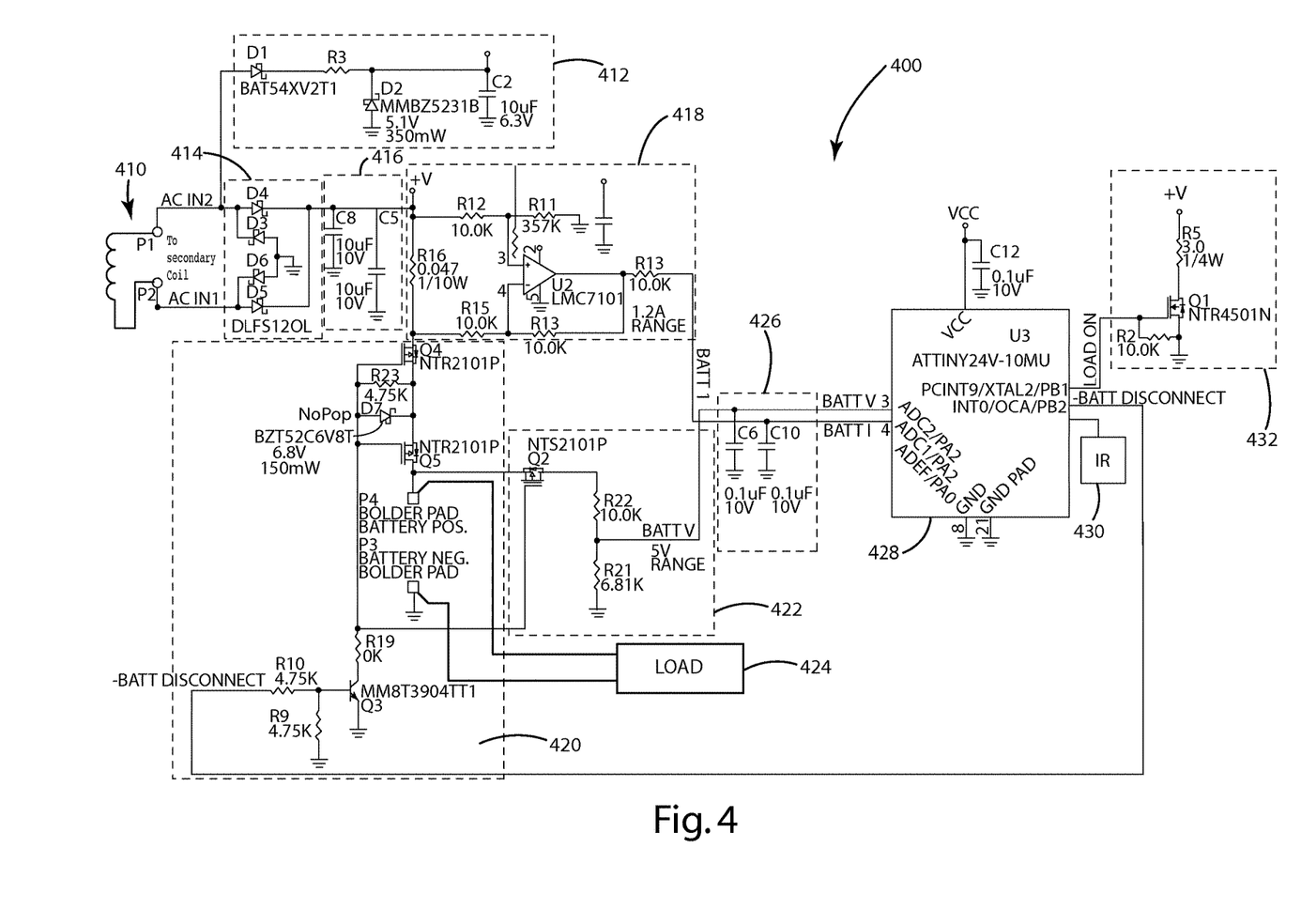
FIG. 4 is a circuit diagram of a secondary circuit.

For purposes of disclosure, one embodiment of a secondary circuit 400 is shown in FIG. 4. In the embodiment of FIG. 4, the secondary circuit 400 generally includes a secondary 410 for receiving power from the inductive power supply 300, a rectifier 414 (or other components for converting AC power to DC), a low voltage power supply 412 that scales the received power to operate the secondary controller 428, conditioning circuitry 416, 426 to remove ripple in the signal, current sensor 418, voltage sensor 422, switch 420, load 424, secondary controller 428, a signal resistor 432 and an optional wireless transmitter 430. In operation, the rectifier 414 converts the AC power generated in the secondary 410 to DC power, which is typically needed to power the load. Alternatively, multiple secondary coils receiving power on different phases can be used to reduce the ripple voltage. This is referenced in Application 60/976, 137, entitled Multiphase Inductive Power Supply System to Baarman et al, which is herein incorporated by reference. Multiple primary coils may be desired to transmit power on different phases in such an embodiment. In one embodiment, the load is a charging circuit (not shown) for a battery. Charging circuits are well-known and are widely used with a variety of rechargeable electronic devices. If desired, the charging circuit may be configured to both charge a battery (not shown) and/or power the load 424. In alternative embodiments the rectifier may be unnecessary and AC power may be conditioned to be used to power the load.

The current sensor 418 detects the amount of current in the received power and provides that information to the secondary controller 428. The voltage sensor 422 detects the amount of voltage in the received power and provides that information to the secondary controller 428. Although the illustrated embodiment includes both a voltage sensor 422 and a current sensor 418, only one is necessary. By sensing the voltage and/or current in the secondary circuit and knowing the voltage and/or current provided by the primary circuit, the primary controller can calculate the power transfer efficiency. By sweeping a range of operating frequencies, noting the power transfer efficiency at each frequency, the operating frequency closest to resonance can be determined—it corresponds with the operating frequency that yields the best power transfer efficiency. In addition, the voltage and current sensors 418, 422 can be used in conjunction with a protection algorithm in the secondary controller 428 to disconnect the load 424 if a fault condition is detected. This concept is described in more detail in U.S. patent application Ser. No. 11/855,710 entitled System and Method for Inductively Charging a Battery to Baarman et al, which was previously incorporated by reference.

The secondary controller 428 may be essentially any type of microcontroller. In the illustrated embodiment, the secondary controller 428 is an ATTINY24V-10MU microcontroller. The secondary controller 428 generally includes an analog to digital converter, and is programmed to process the voltage and/or current readings and transmit them to the primary controller 310 of the inductive power supply 300. The microprocessor may also include other code unrelated to the frequency or duty cycle control processes.

Communication of the sensed voltage and/or current in the secondary may be transmitted to the primary controller 310 in a variety of ways. In the illustrated embodiment, the information may be transmitted using the signal resistor 432 or the wireless transmitter 430.

In one embodiment, signal resistor 432 may be used to send information to the primary controller 310. The use of a signal resistor 432 to provide communication from the secondary to the primary was discussed in U.S. patent application Ser. No. 11/855,710 entitled System and Method for Inductively Charging a Battery to Baarman et al, which is herein incorporated by reference. The signal resistor 432, when shunted, sends a communication signal that signifies an over-current or over-voltage state. When the resistor is shunted, the peak detector on the primary circuit is able to sense the over-voltage/over-current condition and act accordingly. The signal resistor 432 of the present invention may be shunted systematically to communicate additional data to the primary controller 310. For example, a stream of data could represent the sensed current and/or sensed voltage. Alternatively, the signal resistor could be used solely in the previously described way as an over-voltage/over-current transmitter or it could be removed entirely.

Use of a wireless transmitter or transceiver was previously described in U.S. Patent Application Publication US 2004/130915A1 to Baarman, which is entitled "Adapted Inductive Power Supply with Communication" that was previously incorporated by reference. Specifically, the use of WWI, infrared, blue tooth, cellular or RFID were previously discussed as ways to wirelessly transmit data from a remote device to an inductive power supply. Further, communication using the induction coils and a power line communication protocol was discussed. Any of these methods of transmitting data could be implemented in the present invention in order to transfer the desired data from the secondary to the primary.

IV. Operation

General operation of the primary circuit 100 and secondary circuit 200 is described in connection with FIG. 5.

In this embodiment, the primary circuit determines and sets the initial operating frequency 504. Typically, the goal of setting the initial operating frequency is to set it as close to the resonant frequency as possible, which varies depending on many different factors including, among other things, the orientation and distance between the primary circuit and secondary circuit. In the current embodiment, a simple frequency sweep is used to determine where to set the initial operation frequency. Specifically, in this embodiment, the range of valid frequencies is swept and the power transfer efficiency at each frequency is noted. The step between frequencies may vary, but in the current embodiment, the frequency is swept between 70 k Hz and 250 k Hz at steps of 100 Hz. Once the entire range of frequencies has been swept, the operating frequency that yielded the highest power transfer efficiency is selected as the initial operating frequency. The operating frequency that yielded the highest power transfer efficiency indicates that it is the closest frequency to resonance. Further steps at a finer frequency resolution can facilitate even further tuning. Other methods for determining the initial operating frequency may be used in alternative embodiments. For example, an initial operating frequency may be selected based on known primary and secondary component. Further, modifications to the sweeping process may include dynamic step adjustment proportional to the power transfer efficiency. In yet another alternative embodiment, the sweep may be performed dynamically so that only the power transfer efficiency value for the current frequency and the frequency with the highest power transfer efficiency are stored. As the sweep progresses, each value is checked against the highest stored value and replaces it only if it is higher.

In the embodiment described in FIG. 5, the primary circuit sets the initial duty cycle 506. The duty cycle corresponds with the amount of power transferred with each cycle. The higher the duty cycle, the more power transferred per cycle. In the current embodiment, the initial duty cycle is set at 20%, which is considered low enough to not risk over-powering the remote device, but is high enough such that enough power is transferred to power the secondary circuitry. In alternative embodiments a different initial duty cycle may be set based on the application or any number of other factors.

Figure 6:
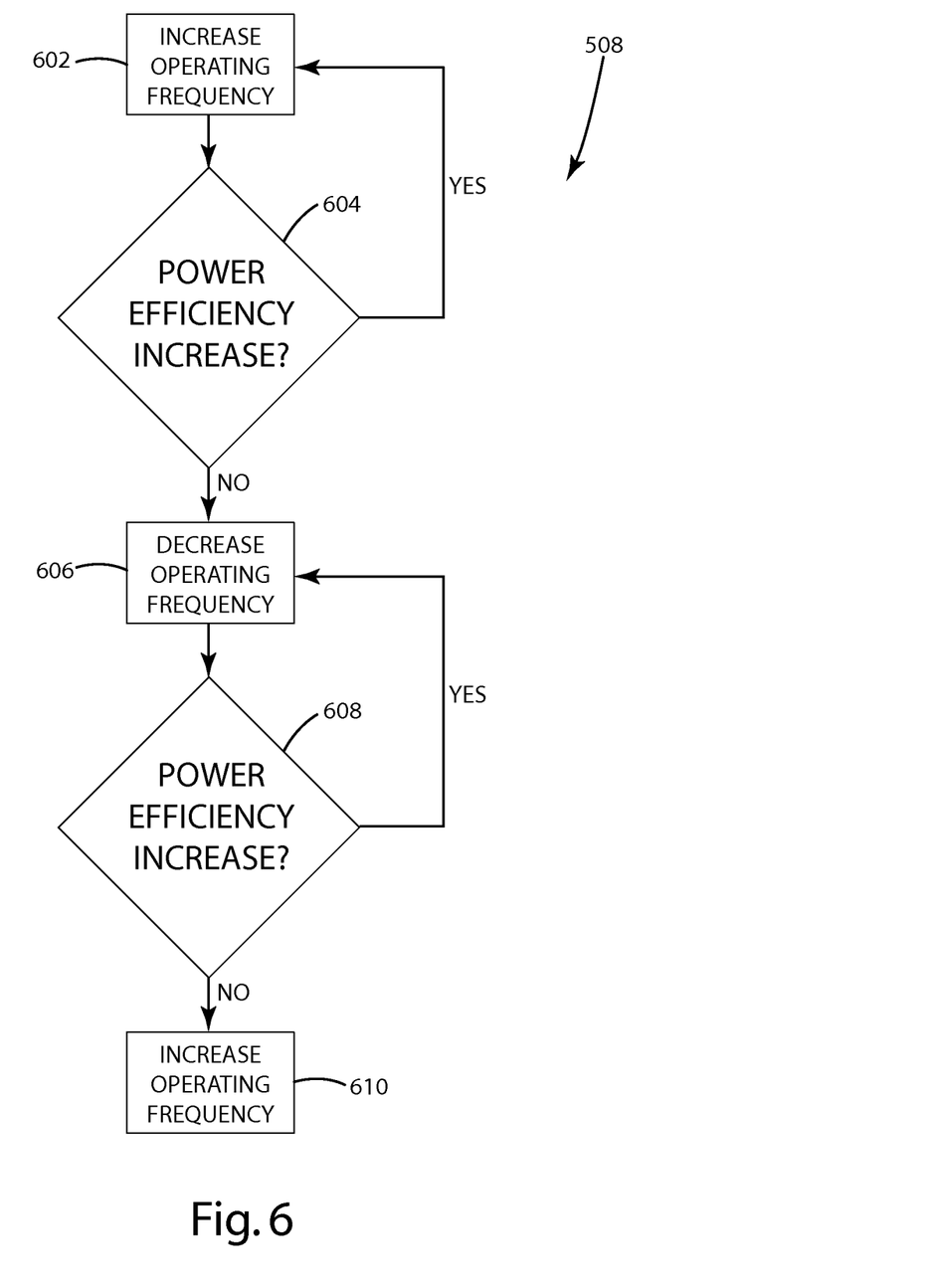
FIG. 6 is a flowchart of a process to adjust the operating frequency to maintain resonance.

The adjust operating frequency step 508 is a multi-step process which ensures that the operating frequency is being maintained substantially at resonance. FIG. 6 describes one embodiment of this process in more detail. In the described embodiment, the operating frequency is increased by a pre-selected amount, referred to as a step up. The adjustment is allowed to propagate through the system and the power efficiency is checked 604. If the power efficiency increased then the system was not substantially at resonance and the operating frequency is stepped up again. This process continues until the power efficiency either decreases or stays the same. Once that occurs, the operating frequency is stepped down 606. The power efficiency is checked 608. If the power efficiency increases then the operating frequency is stepped down again, until the power efficiency stays the same or decreases. The final step is to step up the operating frequency 610 to get back to the operating frequency with the peak power efficiency. This is merely one embodiment of a process to maintain the operating frequency substantially at resonance. Any other process could be used to maintain the operating frequency substantially at resonance.

Figure 7:
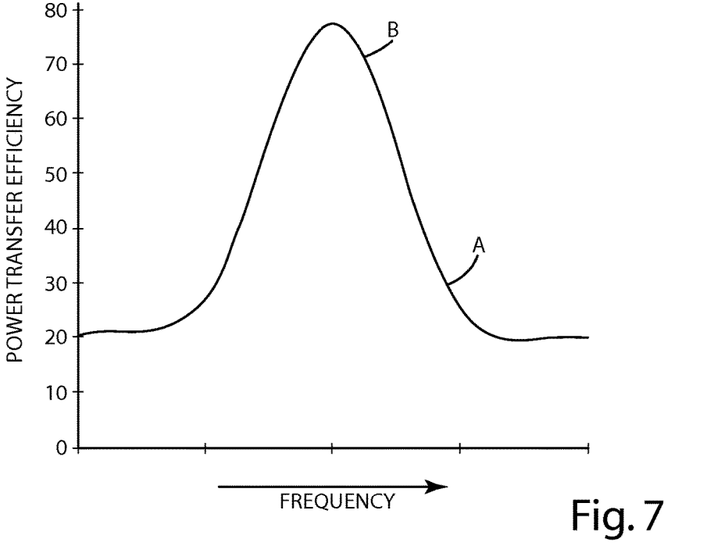
FIG. 7 is an exemplary graph showing frequency versus power transfer efficiency.

One reason that the operating frequency is stepped up and stepped down can be explained by looking at an exemplary graph of operating frequency vs. power efficiency, shown in FIG. 7. As can be seen, there are several peaks of power efficiency over the range of operating frequencies shown. The initial sweep of frequencies sets the operating frequency to the resonant frequency, i.e. the highest peak on FIG. 7. Each time the adjustment comes, although the operating frequency has not changed, the power efficiency values may have changed as a result in any number of factors, most notably movement of the secondary. Typically, the change in the graph is merely a slight shift, meaning that the optimum operating frequency may be a few steps in either direction. This is why the current embodiment steps up and steps down. If the first step up leads to a decrease in power efficiency transfer, the process immediately steps down until. If stepping down also leads to a decrease in power efficiency transfer then it is evident that no adjustment is necessary and the operating frequency was already at resonant frequency. In an alternative embodiment an analog circuit could be used to directly determine how far off resonance the system is, causing the controller to react directly to the proper frequency. A phase comparator is one such circuit.

In the current embodiment, the operating frequency is adjusted with each iteration, however, in alternative embodiments, the operating frequency may be adjusted less frequently or only when an event triggers that it should be adjusted. For example, if a motion detector on the secondary indicates movement or a change in orientation of the secondary. Or, for example, if there is a sharp decrease or increase in the amount of power provided to the secondary.

The next step is to determine if the amount of power being received by the secondary is too high 510. If the amount of power being received is too high then the duty cycle of the power being transferred is reduced 514. If the amount of power being received is not too high then the duty cycle of the power being transferred is increased 512. In the current embodiment, the duty cycle should not exceed approximately 49% in order to reduce the risk of causing a short circuit. In the current embodiment, after the duty cycle is adjusted, up or down, the operating frequency is re-adjusted 508. As explained above, duty cycle refers to the "switch on time" or the proportion of time during which the waveform is high compared to the total amount of time for a complete waveform. An exemplary graph illustrating a signal with a varying duty cycle is shown in FIG. 8. The graph depicts a graph of time vs. current. The solid line represents the waveform generated by the primary circuit with the current duty cycle. The dashed line represents what a waveform would look like with an increased duty cycle. The dash-dotted line represents what a waveform would look like with a decreased duty cycle. Note that because the duty cycle is being increased symmetrically and decreased symmetrically, the frequency of the waveform does not change with the adjustment in duty cycle. It is worth noting that in some embodiments, during operation, the frequency may not be adjusted, while duty cycle adjustments continue to take place.

Duty cycle may be stepped up or down by a pre-selected amount. In the current embodiment, the step up and step down amounts are static and equal. However, in alternative embodiments, the step amounts may be dynamic and different. For example, in battery charging applications it may be beneficial to decrease duty cycle in large steps and increase duty cycle in small steps. Various batteries require different charging algorithms and the duty cycle control may be used to provide the correct battery charging profile. In another example, the duty cycle may be stepped up or down proportional to the amount of power demanded by the secondary. The amount of power demanded by the secondary can be determined by reading the current and/or voltage sensor. Where there is a small change in the readings, a small change in duty cycle may be implemented and where there is a large change in the readings, a large change in duty cycle may be implemented.

In one embodiment, there are built-in delays between the changes in operating frequency and changes in duty cycle. These delays can account for any phase issues that may arise because of the speed at which the operating frequency or duty cycle is being changed.

This process continues as desired or until the power supply is turned off, the secondary is removed, or in the case of charging a battery, when the battery is fully charged.

The primary circuit may adjust the duty cycle depending on the demands of the secondary. For example, in one embodiment, one goal may be to maintain a certain amount of voltage or current in the secondary. Using feedback from the secondary, such as the sensed voltage and/or current, the operating frequency may be adjusted to ensure optimum power transfer efficiency by ensuring operation at substantially resonant frequency and the duty cycle may be adjusted to provide additional or less power to meet the desired goal.

The above description is that of the current embodiment of the invention. Various alterations and changes can be made without departing from the spirit and broader aspects of the invention.

The invention claimed is:

1. An inductive power supply for providing power wirelessly to a remote device, said inductive power supply comprising:
    a primary circuit for controlling power transfer to the remote device according to at least one operating parameter, said primary circuit configured to adjust a duty cycle of a signal to allow variation in an amount of power transferred to the remote device;
    a wireless receiver configured to receive information communicated from the remote device;
    a sensor configured to sense a characteristic of power in the inductive power supply;
    a tank circuit in electrical communication with said primary circuit, said tank circuit configured to inductively couple with the remote device;
    wherein said primary circuit controls, based on sensor output from said sensor, said at least one operating parameter to achieve a desired operating point; and
    wherein said primary circuit controls said duty cycle of said signal to maintain an amount of power transferred despite variations in operating conditions that affect resonant frequency.

2. The inductive power supply of claim 1 wherein, based on said information communicated from the remote device, said primary circuit adjusts at least one of said duty cycle to control said amount of power transferred and said at least one operating parameter to transfer power substantially near resonance.

3. The inductive power supply of claim 1 wherein said at least one operating parameter includes at least one of an operating frequency and a resonant frequency, and wherein said primary circuit is configured to maintain said desired operating point by controlling said at least one operating parameter.

4. The inductive power supply of claim 1 wherein said primary circuit continuously adjusts said at least one operating parameter to maintain said desired operating point and continuously adjusts said duty cycle based on a comparison between said amount of power transferred to said remote device and a threshold.

5. The inductive power supply of claim 1 wherein said primary circuit includes:
    a primary controller;
    a driver circuit in electrical communication with said primary controller;
    a switching circuit in electrical communication with said driver circuit; and
    wherein said sensor is configured to sense reflected impedance of said remote device through said inductive coupling, wherein said sensor is in electrical communication with said tank circuit and said primary controller.

6. The inductive power supply of claim 5 wherein said inductive power supply is configured to receive feedback from said remote device.

7. The inductive power supply of claim 6 wherein said primary controller adjusts, as a function of output of said sensor, at least one of a) said at least one operating parameter and b) said duty cycle.

8. An inductive power supply for providing power wirelessly to a remote device, said inductive power supply comprising:
- a primary circuit for controlling power transfer according to at least one operating parameter, said primary circuit configured to adjust a duty cycle of a signal to affect an amount of power transferred;
- a wireless receiver configured to receive information via a communication link from the remote device;
- a tank circuit in electrical communication with said primary circuit, said tank circuit configured to inductively couple with the remote device, wherein said primary circuit applies said signal to said tank circuit to transfer power to the remote device;
- a sensor in electrical communication with said tank circuit, said sensor configured to sense a characteristic of power in said tank circuit;
- wherein said primary circuit controls said at least one operating parameter to achieve an operating point; and
- wherein, based on a sensor output from said sensor, said primary circuit adjusts said duty cycle of said signal to change said amount of power transferred.

9. The inductive power supply of claim 8 wherein, based on said information communicated from said remote device, said primary circuit adjusts at least one of a) said duty cycle to change said amount of power transferred and b) said at least one operating parameter to affect operating efficiency.

10. The inductive power supply of claim 8 wherein said at least one operating parameter includes at least one of an operating frequency and a resonant frequency.

11. The inductive power supply of claim 10 further comprising a memory for storing information, wherein said information includes at least one of a resonant frequency, a maximum operating frequency, a minimum operating frequency, a current usage, a minimum duty cycle, a maximum duty cycle and wireless communication protocol of said remote device.

12. The inductive power supply of claim 8 wherein said primary circuit continuously adjusts said at least one operating parameter to maintain a desired operating point and continuously adjusts said duty cycle based on a comparison between said amount of power transferred to said remote device and a threshold.

13. The inductive power supply of claim 8 wherein said primary circuit includes:
- a primary controller;
- a driver circuit in electrical communication with said primary controller; and
- a switching circuit in electrical communication with said driver circuit.

14. The inductive power supply of claim 13 wherein said switching circuit includes a pair of switches,
- wherein each switch is switched at said duty cycle and at an operating frequency, but out of phase with each other; and
- wherein, in response to output of said sensor, said primary controller controls said operating frequency of each of said switches; and
- wherein, in response to output of said sensor, said primary controller controls said duty cycle of each of said switches.

15. The inductive power supply of claim 13 wherein said primary controller adjusts, based on information received from the remote device, at least one of a) said at least one operating parameter and b) said duty cycle.

16. A method for wirelessly supplying power from an inductive power supply to a remote device, comprising the steps of:
- placing a remote device in sufficient proximity to an inductive power supply to establish an inductive coupling between the remote device and a tank circuit of the inductive power supply;
- in the inductive power supply, operating the inductive power supply according to a frequency parameter to transfer power from tank circuit to the remote device via the inductive coupling;
- in the inductive power supply, controlling a duty cycle of a signal supplied to the tank circuit to transfer power from the tank circuit to the remote device via the inductive coupling;
- sensing a characteristic of power in the tank circuit, wherein the characteristic of power is indicative of a reflected impedance of the remote device through the inductive coupling;
- receiving, in the inductive power supply, information communicated from the remote device; and
- determining, based at the sensed characteristic of power, whether to adjust the frequency parameter or the duty cycle, wherein adjusting at least one of the frequency parameter and the duty cycle changes an amount of power transferred to the remote device.

17. The method of claim 16 further comprising:
- in the remote device, taking measurements of a characteristic of power wirelessly received from the inductive power supply;
- receiving, in the inductive power supply, communication from the remote device indicative of the measurements taken in the remote device; and
- determining, based on the communication from the remote device, at least one of (a) an operating frequency and (b) the duty cycle, wherein the frequency parameter includes the operating frequency.

18. The method of claim 17 wherein said determining step includes determining an operating frequency to achieve a desired operating point.

19. The method of claim 16 further comprising continuously controlling the frequency parameter and the duty cycle.

20. The method of claim 16 wherein said controlling a duty cycle of a signal supplied to the tank circuit includes maintaining an amount of power transferred despite variations in conditions that affect the resonant frequency.

* * * * *